US012665518B2

(12) United States Patent
Chen et al.

(10) Patent No.: US 12,665,518 B2
(45) Date of Patent: Jun. 23, 2026

(54) SWITCHING POWER SUPPLY PROTECTION CIRCUIT AND POWER SUPPLY SYSTEM

(71) Applicant: Guangdong Carrier Heating, Ventilation & Air Conditioning, Foshan (CN)

(72) Inventors: Qingjun Chen, Foshan (CN); Shanghua Feng, Foshan (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 194 days.

(21) Appl. No.: 18/343,798

(22) Filed: Jun. 29, 2023

(65) Prior Publication Data

US 2024/0007002 A1 Jan. 4, 2024

(30) Foreign Application Priority Data

Jul. 1, 2022 (CN) .......................... 202210775539.9

(51) Int. Cl.
H02M 3/335 (2006.01)
H02H 7/12 (2006.01)
(Continued)

(52) U.S. Cl.
CPC ...... H02M 3/33523 (2013.01); H02H 7/1213 (2013.01); H02M 1/348 (2021.05); H02M 1/36 (2013.01)

(58) Field of Classification Search
CPC ...... H02M 1/0009; H02M 1/348; H02M 1/36; H02M 3/33523
See application file for complete search history.

(56) References Cited

U.S. PATENT DOCUMENTS 4,988,889 A     1/1991 Oughton, Jr.
2003/0103366 A1*  6/2003 MacDonald ............ G06F 1/263
                                                363/131
(Continued)

FOREIGN PATENT DOCUMENTS

CN     101795063 A   8/2010
CN     203289341 U   11/2013
(Continued)

OTHER PUBLICATIONS

Han et al., Compensation Design With TL431 for UCC28600, Jan. 2013, Texas Instruments, SLUA671, 1-12 (Year: 2013).*
(Continued)

*Primary Examiner* — Jue Zhang
(74) *Attorney, Agent, or Firm* — Souad Hakim

(57)         ABSTRACT
A switching power supply protection circuit includes a protection circuit, a switching circuit, a voltage feedback circuit, and a control circuit. The protection circuit is connected to the switching circuit, the voltage feedback circuit, and the control circuit, and controls output switch-on or output switch-off, controls switch-on or switch-off of the switching circuit, and controls the supply voltage. The switching circuit is connected to the control circuit and controls a working state of the control circuit. The voltage feedback circuit is connected to the control circuit and adjusts a control voltage and transmits the feedback voltage to the protection circuit. The control circuit is connected to a power supply and receives a voltage of the power supply for charging, provides a starting voltage for the protection circuit and controls the supply voltage according to the control voltage.

17 Claims, 1 Drawing Sheet

(51) Int. Cl.
    *H02M 1/34*          (2007.01)
    *H02M 1/36*          (2007.01)

(56)              References Cited

U.S. PATENT DOCUMENTS

| | | | |
|---|---|---|---|
| 2003/0197425 A1* | 10/2003 | Montante ................ | H02M 1/10 |
| | | | 307/26 |
| 2012/0105027 A1 | 5/2012 | Dunipace | |

FOREIGN PATENT DOCUMENTS

| | | |
|---|---|---|
| CN | 206673832 U | 11/2017 |
| CN | 109599925 | 4/2019 |
| CN | 110071642 A | 7/2019 |
| CN | 112530279 A | 3/2021 |
| CN | 215646610 U | 1/2022 |
| EP | 2953426 A1 | 12/2015 |

OTHER PUBLICATIONS

Extended European Search Report received for EP Application No. 23182884.9, mailed on Nov. 7, 2023, 8 Pages.

* cited by examiner

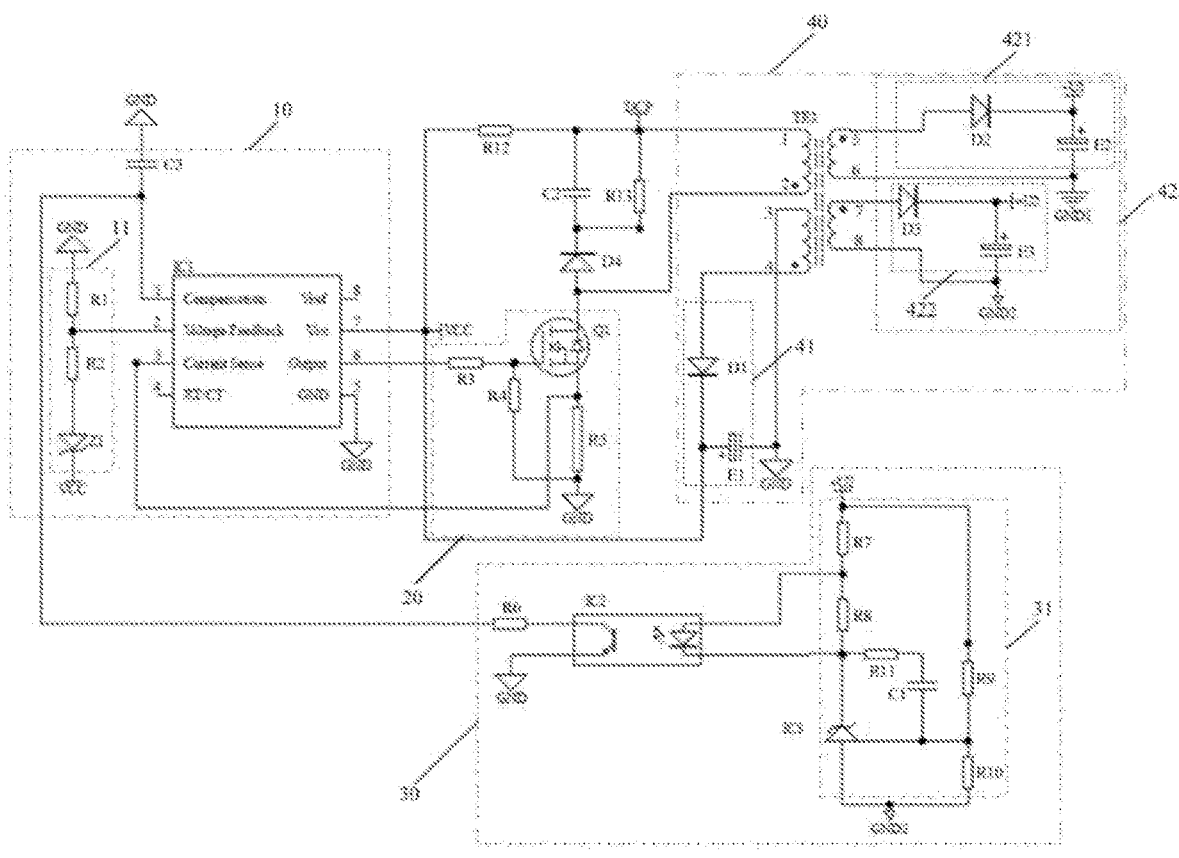

SWITCHING POWER SUPPLY PROTECTION CIRCUIT AND POWER SUPPLY SYSTEM

CROSS REFERENCE TO RELATED APPLICATIONS

This application claims priority to Chinese Patent Application No. CN202210775539.9 filed on Jul. 1, 2022.

TECHNICAL FIELD

This application relates to the field of power supply circuit technologies, and more specifically, relates to a switching power supply protection circuit and a power supply system.

BACKGROUND

A switching power supply is a type of power supply that directly controls an inductive component (an inductor or a transformer) connected to it by a switching tube and achieves voltage or current transformation through an energy storage and release process of the inductive component. It maintains a stable output signal by adjusting a time ratio of switch-on and off of the switching tube and is widely applied in various electronic devices such as industrial control, communication and office, and household consumption.

In the field of switching power supply, many chips with built-in overvoltage protection circuits have emerged. However, an overvoltage protection value of the chip itself is too high compared to a required value of a circuit, and conventional switching power supply circuits generally only rely on optocouplers as output feedback. When the optocoupler fails, the chip cannot receive effective feedback signals, and the supply voltage and the transformer secondary outputs increase to tens of volts, which exceeds a withstand voltage value of some components in the circuit, leading to circuit damage.

SUMMARY OF THE INVENTION

A technical problem to be solved by embodiments of this application is that the failure of an optocoupler in relevant technologies causes the failure of voltage feedback, and further leads to circuit damage.

To solve the above technical problem, the embodiments of this application provide a switching power supply protection circuit, which uses the following technical solutions:

including a protection circuit, a switching circuit, a voltage feedback circuit, and a control circuit;

the protection circuit is respectively connected to the switching circuit, the voltage feedback circuit, and the control circuit, and is used to obtain a corresponding supply voltage according to a control voltage of the control circuit, control output switch-on or output switch-off based on the supply voltage, correspondingly control switch-on or switch-off of the switching circuit according to the output switch-on or the output switch-off, and control the supply voltage according to a feedback voltage of the voltage feedback circuit;

the switching circuit is connected to the control circuit and is used to control a working state of the control circuit, where the working state includes working and stop-working;

the voltage feedback circuit is connected to the control circuit and is used to adjust the control voltage and transmit the feedback voltage to the protection circuit; and the control circuit is connected to a power supply and is used to receive a voltage of the power supply for charging, provide a starting voltage for the protection circuit and control the supply voltage according to the control voltage.

Further, the protection circuit includes a protection chip and a voltage-dividing circuit, and the protection chip is provided with a power pin, a compensation pin, a voltage feedback pin, a current sampling pin, and an output pin;

the power pin is connected to the control circuit, the compensation pin is connected to the voltage feedback circuit, the voltage feedback pin is connected to the voltage-dividing circuit, the current sampling pin is connected to the switching circuit, and the output pin is connected to the switching circuit; and the voltage-dividing circuit is connected to the supply voltage and is used to control an input voltage of the voltage feedback pin according to the supply voltage.

Further, the voltage-dividing circuit includes a first voltage-dividing resistance, a second voltage-dividing resistance, and a Zener diode;

a first end of the first voltage-dividing resistance is connected to a first end of the second voltage-dividing resistance, and a public connection point thereof is connected to the voltage feedback pin, and a second end of the first voltage-dividing resistance is grounded;

a second end of the second voltage-dividing resistance is connected to an anode of the Zener diode; and a cathode of the Zener diode is connected to the supply voltage.

Further, the switching circuit includes a switching tube, a first resistance, a second resistance, and a sampling resistance;

a gate of the switching tube is respectively connected to a first end of the first resistance and a first end of the second resistance, a source of the switching tube is respectively connected to the current sampling pin and a first end of the sampling resistance, and a drain of the switching tube is connected to the control circuit; and a second end of the first resistance is connected to the output pin, a second end of the second resistance is grounded, and a second end of the sampling resistance is grounded.

Further, the voltage feedback circuit includes a third resistance, an optocoupler, and a closed-loop control circuit;

a first end of the third resistance is connected to the protection circuit, and a second end of the third resistance is connected to a collector of an input triode of the optocoupler;

an emitter of the input triode of the optocoupler is grounded, and an output diode of the optocoupler is connected to the closed-loop control circuit; and the closed-loop control circuit is electrically connected to the control circuit.

Further, the closed-loop control circuit includes a fourth resistance, a fifth resistance, a voltage regulator chip, a sixth resistance, a seventh resistance, an eighth resistance, and a first capacitance;

a first end of the fourth resistance is connected to the control voltage, and a second end of the fourth resistance is connected to a public connection point between a first end of the fifth resistance and an anode of the output diode of the optocoupler;

a second end of the fifth resistance is respectively connected to a first end of the voltage regulator chip and a cathode of the output diode of the optocoupler;

a second end of the voltage regulator chip is grounded, a third end of the voltage regulator chip is connected to a public connection point between a first end of the sixth resistance and a first end of the seventh resistance;

a second end of the sixth resistance is connected to the control voltage and a second end of the seventh resistance is grounded;

a first end of the eighth resistance is connected to a public connection point between the second end of the fifth resistance and the first end of the voltage regulator chip, and a second end of the eighth resistance is connected to the first end of the first capacitance; and the second end of the first capacitance is connected to the third end of the voltage regulator chip, the first end of the sixth resistance, and the first end of the seventh resistance.

Further, the control circuit includes a voltage circuit, a transformer, and an output circuit;

the voltage circuit is respectively connected to the power supply and a first input end of the transformer and is used to receive a voltage of the power supply for charging and provide the supply voltage for the protection circuit;

a second input end of the transformer is respectively connected to the switching circuit and the power supply, and an output end of the transformer is connected to the output circuit; and the output circuit is electrically connected to the voltage feedback circuit and is used to control the supply voltage according to the control voltage.

Further, the voltage circuit includes a first supercapacitor and a first diode; the transformer comprises a first primary winding, a second primary winding, a first secondary winding, and a second secondary winding; the first input end is an input end of the first primary winding and includes a first end and a second end, and the second input end is an input end of the second primary winding and includes a third end and a fourth end; the output end includes a first output end of the first secondary winding and a second output end of the second secondary winding; the output circuit includes a first output circuit and a second output circuit;

a first end of the first supercapacitor is respectively connected to the power supply and a cathode of the first diode, and a second end of the first supercapacitor is grounded;

an anode of the first diode is connected to a fourth end of the second primary winding;

the first end of the first primary winding is connected to the power supply, the second end of the first primary winding is connected to the switching circuit, and the third end of the second primary winding is grounded; and the first output end of the first secondary winding is connected to the first output circuit, and the second output end of the second secondary winding is connected to the second output circuit.

Further, the switching power supply protection circuit further includes a starting resistance, a protective resistance, a protective capacitance, and a protection diode;

a first end of the starting resistance is connected to the power supply and the control circuit, a second end of the starting resistance is respectively connected to the protection circuit and the control circuit;

a first end of the protective resistance is connected to the power supply, and a second end of the protective resistance is respectively connected to a second end of the protective capacitance and a cathode of the protection diode;

the second end of the protective capacitance is connected to a public connection point between the first end of the protective resistance and the power supply; and an anode of the protection diode is connected to the switching circuit and the control circuit.

To solve the above technical problem, the embodiments of this application further provide a power supply system, which uses the following technical solution: the power supply system includes the switching power supply protection circuit as stated above.

DESCRIPTION OF DRAWING

In order to illustrate the solution in this application more clearly, a brief introduction will be given below to the drawings that need to be used in the description of the embodiments. Obviously, the drawings in the following description are some embodiments of this application; for those skilled in the art, other drawings can also be obtained based on these drawings without creative efforts.

The FIGURE is a schematic diagram of a circuit according to an embodiment of a switching power supply protection circuit provided by this application.

DETAILED DESCRIPTION

Compared with the prior art, the embodiments of this application mainly have the following beneficial effects: this application provides a switching power supply protection circuit, including a protection circuit, a switching circuit, a voltage feedback circuit, and a control circuit. The protection circuit is respectively connected to the switching circuit, the voltage feedback circuit, and the control circuit, and is used to obtain a corresponding supply voltage according to a control voltage of the control circuit, control output switch-on or output switch-off based on the supply voltage, correspondingly control switch-on or switch-off of the switching circuit according to the output switch-on or the output switch-off, and control the supply voltage according to a feedback voltage of the voltage feedback circuit. The switching circuit is connected to the control circuit and is used to control a working state of the control circuit, where the working state includes working and stop-working. The voltage feedback circuit is connected to the control circuit and is used to adjust the control voltage and transmit the feedback voltage to the protection circuit; and the control circuit is connected to a power supply and is used to receive a voltage of the power supply for charging, provide a starting voltage for the protection circuit and control the supply voltage according to the control voltage. In this application, the voltage feedback circuit controls the supply voltage of the protection circuit by means of the control circuit, and controls output switch-off of the protection circuit according to the supply voltage. When the voltage of the protection circuit fails, its control over the control circuit fails. The increase in the control voltage causes the supply voltage of the protection circuit to increase. The protection circuit switches off the output to prevent the output voltage from being too high and damaging the circuit, improving the stability of the circuit, and extending the service life of the power supply system.

Unless otherwise defined, all technical and scientific terms used herein have the same meaning as commonly understood by those skilled in the art of this application; the terms used herein in the description of this application are only for the purpose of describing specific embodiments, and are not intended to limit this application; the terms "comprising" and "having" and any variations thereof in the description and claims of this application and the description of the above drawings are intended to cover non-exclusive inclusions. The terms "first", "second" and the like in the description and claims of this application or the above drawings are used to distinguish different objects, rather than to describe a specific order.

Reference to an "embodiment" in this text means that a particular feature, structure, or characteristic described in conjunction with the embodiment can be included in at least one embodiment of this application. The occurrences of this phrase in various places in the description do not necessarily all refer to the same embodiment, nor are separate or alternative embodiments mutually exclusive of other embodiments. It is understood explicitly and implicitly by those skilled in the art that the embodiments described herein can be combined with other embodiments.

In order to enable those skilled in the art to better understand the solutions of the present application, the technical solutions in the embodiments of the present application will be clearly and completely described below in conjunction with the accompanying drawings.

Embodiments of this application provide a switching power supply protection circuit, including a protection circuit 10, a switching circuit 20, a voltage feedback circuit 30, and a control circuit 40.

The protection circuit 10 is respectively connected to the switching circuit 20, the voltage feedback circuit 30, and the control circuit 40, and is used to obtain a corresponding supply voltage VCC according to a control voltage +U2 of the control circuit 40, control output switch-on or output switch-off based on the supply voltage VCC, correspondingly controls switch-on or switch-off of the switching circuit 20 according to output switch-on or output switch-off, and controls the supply voltage VCC of the protection circuit 10 according to a feedback voltage of the voltage feedback circuit 30.

The switching circuit 20 is connected to the control circuit 40 and is used to control a working state of the control circuit 40, where the working state includes working and stop-working. Specifically, when an output of the protection circuit 10 is switched on, the switching circuit 20 receives a drive current, the switching circuit 20 is switched on, and the control circuit 40 normally works; when the output of the protection circuit 10 is switched off, the switching circuit 20 is switched off, and the control circuit 40 stops working.

The voltage feedback circuit 30 is connected to the control circuit 40 and is used to adjust the control voltage +U2 and transmit the feedback voltage to the protection circuit 10. The circuit of the voltage feedback circuit 30 can adjust the control voltage +U2, and further controls the supply voltage VCC of the protection circuit 10, so as to make a switching power supply circuit maintain a relatively stable and suitable voltage range and ensure the normal operation of the circuit.

The control circuit 40 is connected to the power supply DCP and is used to receive a voltage of the power supply DCP for charging, provide a starting voltage for the protection circuit 10, and controls the supply voltage VCC of the protection circuit 10 according to the control voltage +U2.

When a circuit starts, the power supply DCP charges the control circuit 40. When the charging voltage reaches the starting voltage of the chip in the protection circuit 10, the chip starts working; the protection circuit 10 outputs current to drive the switching circuit 20 to conduct, the entire switching power supply protection circuit starts working, and the chip is powered by the supply voltage VCC.

In this embodiment, the protection circuit 10 includes a protection chip IC1 and a voltage-dividing circuit 11, where the protection chip IC1 is provided with a power pin Vcc, a compensation pin Compensation, a voltage feedback pin Voltage Feedback, a current sampling pin Current Sense, and an output pin Output.

The power pin Vcc is connected to the control circuit 40, the compensation pin Compensation is connected to the voltage feedback circuit 30, the voltage feedback pin Voltage Feedback is connected to the voltage-dividing circuit 11, the current sampling pin Current Sense is connected to the switching circuit 20, and the output pin Output is connected to the switching circuit 20.

The voltage-dividing circuit 11 is connected to the supply voltage VCC and is used to control an input voltage of the voltage feedback pin Voltage Feedback according to the supply voltage VCC. Specifically, after the failure of the voltage feedback circuit 30, the control voltage +U2 loses control and the voltage continues to rise. Due to the correlation between the supply voltage VCC and the control circuit 40, the supply voltage VCC also continues to rise. When the supply voltage VCC reaches a preset voltage value, the output voltage of the voltage-dividing circuit 11 controls the input voltage of the voltage feedback pin Voltage Feedback to reach a trigger voltage, the voltage feedback pin Voltage Feedback is triggered. By means of an internal circuit of the protection chip IC1, the output pin Output is switched off, the switching circuit 20 is also switched off, the control circuit 40 stops working, the control voltage of the control circuit 40 stops rising, and the supply voltage VCC further stops rising; since the supply voltage VCC supplies power to the protection chip IC1, when the supply voltage VCC is consumed and drops to a certain voltage, the output voltage of the voltage-dividing circuit 11 controls the input voltage of the voltage feedback pin Voltage Feedback to be less than the trigger voltage, the voltage feedback pin Voltage Feedback stops triggering, the output pin Output outputs the driving current, the control circuit 40 works again, and the supply voltage VCC rises again. Continuously repeating this process can achieve the output voltage regulation of the supply voltage VCC and the control circuit 40.

The protection chip IC1 is also provided with a grounding pin GND, a reference voltage pin Vref and a RT/TC pin, which are connected to corresponding circuits according to actual needs.

In this embodiment, the voltage-dividing circuit 11 includes a first voltage-dividing resistance R1, a second voltage-dividing resistance R2, and a Zener diode Z1, where a first end of the first voltage-dividing resistance R1 is connected to a first end of the second voltage-dividing resistance R2, and a public connection point thereof is connected to the voltage feedback pin Voltage Feedback of the protection chip IC1, and a second end of the first voltage-dividing resistance R1 is grounded; a second end of the second voltage-dividing resistance R2 is connected to an anode of the Zener diode Z1; and a cathode of the Zener diode Z1 is connected to the supply voltage VCC.

Specifically, when the voltage feedback circuit 30 normally works, the Zener diode Z1 is in a cut-off state, and the voltage on the second voltage-dividing resistance R2 does not reach the trigger voltage set by the protection chip IC1 for the voltage feedback pin Voltage Feedback; after the failure of the voltage feedback circuit 30, the control voltage +U2 loses control, the voltage continues to rise, and the supply voltage VCC also continues to rise. When the voltage reaches a preset value, the Zener diode Z1 is broken down; at this time, due to the voltage-dividing effect of the first voltage-dividing resistance R1 and the second voltage-dividing resistance R2, the voltage on the first voltage-dividing resistance R1 does not reach the trigger voltage set by the protection chip IC1 for the voltage feedback pin Voltage Feedback. Therefore, the supply voltage VCC continues to rise, and when the voltage reaches the preset voltage value, the voltage on the first voltage-dividing resistance R1 reaches the trigger voltage of the voltage feedback pin Voltage Feedback, the voltage feedback pin Voltage Feedback is triggered, the output pin Output is switched off, the switching circuit 20 is also switched off, the control circuit 40 stops working, the control voltage of the control circuit 40 stops rising, and the supply voltage VCC further stops rising.

In some optional implementations of this embodiment, the switching circuit 20 includes a switching tube Q1, a first resistance R3, a second resistance R4, and a sampling resistance R5. The switching tube Q1 is a MOS tube, a gate of the switching tube Q1 is respectively connected to the first end of the first resistance R3 and the first end of the second resistance R4, a source of the switching tube Q1 is respectively connected to the current sampling pin Current Sense of the protection chip IC1 and the first end of the sampling resistance R5, and a drain of the switching tube Q1 is connected to the control circuit 40. The second end of the first resistance R3 is connected to the output pin Output of the protection chip IC1, the second end of the second resistance R4 is grounded, and the second end of the sampling resistance R5 is grounded.

The first resistance R3 is a gate resistance of the switching tube Q1 and is used to current limiting to prevent excessive instantaneous current of the switching tube Q1. The second resistance R4 serves as a releasing resistor of the switching tube Q1 to release static electricity, preventing the switching tube Q1 from being damaged by static electricity. The sampling resistance R5 feeds the collected voltage back to the protection chip IC1 by means of the current sampling pin Current Sense, and the protection chip IC1 can adjust a duty ratio of the switching tube Q1 through its changes in voltage.

When the supply voltage VCC reaches the preset voltage value, the voltage on the first voltage-dividing resistance R1 reaches the trigger voltage of the voltage feedback pin Voltage Feedback, the voltage feedback pin Voltage Feedback is triggered, and the output pin Output is switched off. Since the output pin Output outputs the drive current of the switching tube Q1, the switching tube Q1 is switched off, the control circuit 40 stops working, the control voltage of the control circuit 40 stops rising, and the supply voltage VCC further stops rising. At this time, the supply voltage VCC supplies power for the protection chip IC1; when the supply voltage VCC is consumed and drops to a certain voltage, the voltage on the first voltage-dividing resistance R1 is less than the trigger voltage, the voltage feedback pin Voltage Feedback stops triggering, the output pin Output outputs the drive current, the switching tube Q1 is switched on, and the control circuit 40 starts to work again.

In this embodiment, the voltage feedback circuit 30 includes a third resistance R6, an optocoupler IC2, and a closed-loop control circuit 31. A first end of the third resistance R6 is connected to the protection circuit 10, and a second end of the third resistance R6 is connected to a collector of an input triode of the optocoupler IC2. An emitter of the input triode of the optocoupler IC2 is grounded, and an output diode of the optocoupler IC2 is connected to the closed-loop control circuit 31; and the closed-loop control circuit 31 is electrically connected to the control circuit 40.

Specifically, the first end of the third resistance R6 is connected to the compensation pin Compensation of the protection chip IC1.

When the optocoupler IC2 normally works, the compensation pin Compensation of the protection chip IC1 can receive effective feedbacks, and the voltage feedback circuit 30 can normally work. By means of y adjusting the control voltage +U2 within a stable range, and then controlling the supply voltage VCC by the control voltage +U2, the supply voltage VCC is prevented from continuously increasing and exceeding the withstand voltage values of some components in the circuit, leading to circuit damage. When the optocoupler IC2 fails, the compensation pin Compensation of the protection chip IC1 cannot receive effective feedbacks, and the internal PWM (Pulse Width Modulation) of the protection chip IC1 will remain on, the supply voltage VCC continues to rise, and then subsequently the supply voltage VCC and the output voltage of the control circuit 40 are controlled according to a triggering state of the voltage feedback pin Voltage Feedback of the protection chip IC1.

In some optional implementations, the closed-loop control circuit 31 includes a fourth resistance R7, a fifth resistance R8, a voltage regulator chip IC3, a sixth resistance R9, a seventh resistance R10, an eighth resistance R11, and a first capacitance C1. A first end of the fourth resistance R7 is connected to the control voltage +U2, a second end of the fourth resistance R7 is connected to a public connection point between a first end of the fifth resistance R8 and the anode of the output diode of the optocoupler IC2; a second end of the fifth resistance R8 is respectively connected to a first end of the voltage regulator chip IC3 and a cathode of an output diode of the optocoupler IC2; a second end of the voltage regulator chip IC3 is grounded, and a third end of the voltage regulator chip IC3 is connected to a public connection point between a first end of the sixth resistance R9 and a first end of the seventh resistance R10; a second end of the sixth resistance R9 is connected to the control voltage +U2, and a second end of the seventh resistance R10 is grounded; a first end of the eighth resistance R11 is connected to a public connection point between the second end of the fifth resistance R8 and the first end of the voltage regulator chip IC3; a second end of the eighth resistance R11 is connected to the first end of the first capacitance C1; the second end of the first capacitance C1 is connected to the third end of the voltage regulator chip IC3, the first end of the sixth resistance R9, and the first end of the seventh resistance R10.

The voltage voltage-regulator chip IC3 is packaged with arithmetic instructions that can calculate based on the current parameters of each device in the closed loop control circuit 31, and the control voltage +U2 can be adjusted based on the calculation results.

In this embodiment, the control voltage +U2 is in closed-loop control, and the control voltage +U2 is adjusted by means of the closed-loop control circuit 31 according to the feedback voltage of the protection chip IC1 so as to maintain it in a suitable range. After the failure of the optocoupler IC2, the closed-loop control circuit 31 cannot adjust the control voltage +U2 according to the feedback voltage, the control voltage +U2 loses control, and the voltage continues to rise. The working principle after rising is same as above, which is not repeated herein.

In this embodiment, the control circuit 40 includes a voltage circuit 41, a transformer TR1, and an output circuit 42. The voltage circuit 41 is respectively connected to the power supply DCP and a first input end of the transformer TR1, and is used to receive a voltage of the power supply DCP for charging and provide the supply voltage VCC for the protection circuit 10. A second input end of the transformer TR1 is respectively connected to the switching circuit 20 and the power supply DCP. An output end of the transformer TR1 is connected to the output circuit 42. The output circuit 42 is electrically connected to the voltage feedback circuit 30 and is used to control the supply voltage VCC according to the control voltage +U2.

It should be noted that the output end of the transformer TR1 can be connected to one of the output circuits, or at least two of the output circuits.

Specifically, a detailed explanation will be provided using two output circuits as an embodiment.

The voltage circuit 41 includes a first supercapacitor E1 and a first diode D1. The transformer TR1 includes a first primary winding, a second primary winding, a first secondary winding, and a second secondary winding. The first input end is an input end of the first primary winding and includes a first end 1 and a second end 2. The second input end is an input end of the second primary winding and includes a third end 3 and a fourth end 4. The output end includes a first output end of the first secondary winding and a second output end of the second secondary winding. The output circuit 42 includes a first output circuit 421 and a second output circuit 422.

The first end of the first supercapacitor E1 is respectively connected to the power supply DCP and a cathode of the first diode D1, and a second end of the first supercapacitor E1 is grounded. An anode of the first diode D1 is connected to a fourth end 4 of the second primary winding. The first end 1 of the first primary winding is connected to the power supply DCP, the second end 2 of the first primary winding is connected to the switching circuit 20, and the third end 3 of the second primary winding is grounded. The first output end of the first secondary winding is connected to the first output circuit 421, and the second output end of the second secondary winding is connected to the second output circuit 422.

Specifically, the first output end includes a fifth end 5 and a sixth end 6, and the second output end includes a seventh end 7 and an eighth end 8. The first output circuit 421 includes a second diode D2 and a second supercapacitor E2. An anode of the second diode D2 is connected to the fifth end 5 of the first output end, and a cathode of the second diode D2 is connected to the output voltage +U1. A first end of the second supercapacitor E2 is connected to the cathode of the second diode D2, the second end of the second supercapacitor E2 is connected to the sixth end 6 of the first output end, and the sixth end 6 of the first output end is grounded. The second output circuit 422 includes a third diode D3 and a third supercapacitor E3. An anode of the third diode D3 is connected to the seventh end 7 of the second output end, and a cathode of the third diode D3 is connected to the output voltage +U2. A first end of the third supercapacitor E3 is connected to the cathode of the third diode D3, a second end of the third supercapacitor E3 is connected to the eighth end 8 of the second output end, and the eighth end 8 of the second output end is grounded.

In some optional implementations, the output voltage +U1 of the first output circuit 421 can be transmitted to a subsequent circuit. The output voltage +U2 of the second output circuit 422 is a control voltage, which is adjusted and controlled by means of the closed-loop control circuit 31.

The control voltage +U2 controls the output voltage +U1 and the supply voltage VCC by means of the transformer TR1.

In this embodiment, the switching power supply protection circuit further includes a starting resistance R12, a protective resistance R13, a protective capacitance C2, and a protection diode D4. A first end of the starting resistance R12 is connected to the power supply DCP and the control circuit 40, and a second end of the starting resistance R12 is respectively connected to the protection circuit 10 and the control circuit 40. A first end of the protective resistance R13 is connected to the power supply DCP, and a second end of the protective resistance R13 is respectively connected to a second end of the protective capacitance C2 and a cathode of the protection diode D4. The second end of the protective capacitance C2 is connected to a public connection point between the first end of the protective resistance R13 and the power supply DCP. An anode of the protection diode D4 is connected to the switching circuit 20 and the control circuit 40.

Specifically, the first end of the starting resistance R12 is connected to the first end 1 of the first primary winding of the transformer TR1, and the second end of the starting resistance R12 is respectively connected to the power pin Vcc of the protection chip IC1 and a public connection point between the cathode of the first diode D1 and the first end of the first supercapacitor E1; the anode of the protection diode D4 is respectively connected to the collector of the switching tube Q1 and the second end 2 of the first primary winding of the transformer TR1.

In this embodiment, the protective resistance R13, the protective capacitance C2, and the protection diode D4 compose a surge absorption circuit, which is used to absorb a surge voltage generated when the switching tube Q1 is switched off.

In this embodiment, the protection circuit 10 further includes a capacitance C3, which is used to keep stability of the circuit. Specifically, a first end of the capacitance C3 is connected to the compensation pin Compensation of the protection chip IC1, and a second end of the capacitance C3 is grounded.

The power supply DCP is connected to the first supercapacitor E1 by means of the starting resistance R12, and supplies power for the first supercapacitor E1. When voltages on two ends of the first supercapacitor E1 reach the starting voltage of the protection chip IC1, the protection chip IC1 starts working and outputs a drive current by means of the output pin Output; the switching tube Q1 is conductive, and the entire circuit starts to work. The starting resistance R12 loses its function. Afterwards, the protection chip IC1 is powered by the supply voltage VCC.

After the optocoupler IC2 fails, the compensation pin Compensation of the protection chip IC1 cannot receive effective feedbacks, leading to failure of the voltage feedback circuit 30 which adjusts the control voltage +U2. The internal PWM of the protection chip IC1 will remain on, the control voltage +U2 continues to rise, and the supply voltage VCC and the output voltage +U1 also continue to rise by means of the transformer TR1. When the supply voltage VCC rises to a preset value, where the preset value is set to U1, the Zener diode Z1 is broken down. At this time, due to the voltage-dividing effect of the first voltage-dividing resistance R1 and the second voltage-dividing resistance R2, the voltage on the first voltage-dividing resistance R1 does not reach a trigger voltage U3 (U3=U2−U1) set by the protection chip IC1 for the voltage feedback pin Voltage Feedback, therefore, the supply voltage VCC continues to rise. When it reaches a preset voltage value (U2), the voltage on the first voltage-dividing resistance R1 reaches the trigger voltage U3 of the voltage feedback pin Voltage Feedback, the voltage feedback pin Voltage Feedback is triggered. By means of the internal circuit of the protection chip IC1, the output pin Output is switched off. Since the output pin Output outputs the drive current of the switching tube Q1, the switching tube Q1 is switched off, the transformer TR1 stops working, and the supply voltage VCC and the output voltage of the secondary winding of the transformer TR1 stop rising. At this time, the supply voltage VCC supplies power for the protection chip IC1. When the supply voltage VCC is consumed and drops to a certain voltage, the voltage on the first voltage-dividing resistance R1 is less than the trigger voltage U3, the voltage feedback pin Voltage Feedback stops triggering, the output pin Output outputs the drive current, the switching tube Q1 is conductive, the transformer TR1 works again, and the supply voltage VCC rises again. Continuously repeating this process can achieve the output voltage regulation of the supply voltage VCC and the secondary winding of the transformer TR1, which can effectively prevent the supply voltage VCC and the transformer secondary output voltage from being too high and further protect the circuit.

The embodiments of this application further provide a power supply system, including the switching power supply protection circuit as stated above, which can improve the stability and service life of the power supply system.

Apparently, the embodiments described above are only some of the embodiments of this application, not all of them. The drawings show preferred embodiments of this application, but do not limit the patent scope of this application. This application can be implemented in many different forms, on the contrary, the purpose of providing these embodiments is to make the understanding of the disclosure of this application more thorough and comprehensive. Although this application has been described in detail with reference to the foregoing embodiments, those skilled in the art can still modify the technical solutions described in the foregoing specific embodiments, or perform equivalent replacements for some of the technical features. All equivalent structures made using the content of the description and drawings of this application, directly or indirectly used in other relevant technical fields, are also within the patent protection scope of this application.

The invention claimed is:

1. A switching power supply protection circuit, comprising:

a protection circuit, a switching circuit, a voltage feedback circuit, and a control circuit;

wherein the protection circuit is respectively connected to the switching circuit, the voltage feedback circuit, and the control circuit, and is used to obtain a corresponding supply voltage based on a control voltage of the control circuit, control output switch-on or output switch-off based on the supply voltage, correspondingly control switch-on or switch-off of the switching circuit based on the output switch-on or the output switch-off, and control the supply voltage based on a feedback voltage of the voltage feedback circuit;

the switching circuit is connected to the control circuit and is used to control a working state of the control circuit, wherein the working state comprises working and stop-working;

the voltage feedback circuit is connected to the control circuit and is used to adjust the control voltage and transmit the feedback voltage to the protection circuit; and the control circuit is connected to a power supply and is used to receive a voltage of the power supply for charging, provide a starting voltage for the protection circuit and control the supply voltage based on the control voltage.

2. The switching power supply protection circuit according to claim 1, wherein the protection circuit comprises a protection chip and a voltage-dividing circuit, and the protection chip is provided with a power pin, a compensation pin, a voltage feedback pin, a current sampling pin, and an output pin;

the power pin is connected to the control circuit, the compensation pin is connected to the voltage feedback circuit, the voltage feedback pin is connected to the voltage-dividing circuit, the current sampling pin is connected to the switching circuit, and the output pin is connected to the switching circuit; and the voltage-dividing circuit is connected to the supply voltage and is used to control an input voltage of the voltage feedback pin based on the supply voltage.

3. The switching power supply protection circuit according to claim 2, wherein the voltage-dividing circuit comprises a first voltage-dividing resistance, a second voltage-dividing resistance, and a Zener diode;

a first end of the first voltage-dividing resistance is connected to a first end of the second voltage-dividing resistance, and a public connection point thereof is connected to the voltage feedback pin, and a second end of the first voltage-dividing resistance is grounded;

a second end of the second voltage-dividing resistance is connected to an anode of the Zener diode; and a cathode of the Zener diode is connected to the supply voltage.

4. The switching power supply protection circuit according to claim 2, wherein the switching circuit comprises a switching tube, a first resistance, a second resistance, and a sampling resistance;

a gate of the switching tube is respectively connected to a first end of the first resistance and a first end of the second resistance, a source of the switching tube is respectively connected to the current sampling pin and a first end of the sampling resistance, and a drain of the switching tube is connected to the control circuit; and a second end of the first resistance is connected to the output pin, a second end of the second resistance is grounded, and a second end of the sampling resistance is grounded.

5. The switching power supply protection circuit according to claim 2, wherein the protection circuit further comprises a capacitor connected between the compensation pin of the protection chip and the ground.

6. The switching power supply protection circuit according to claim 1, wherein the voltage feedback circuit comprises a third resistance, an optocoupler, and a closed-loop control circuit;

a first end of the third resistance is connected to the protection circuit, and a second end of the third resistance is connected to a collector of an input triode of the optocoupler;

an emitter of the input triode of the optocoupler is grounded, and an output diode of the optocoupler is connected to the closed-loop control circuit; and the closed-loop control circuit is electrically connected to the control circuit.

7. The switching power supply protection circuit according to claim 6, wherein the closed-loop control circuit comprises a fourth resistance, a fifth resistance, a voltage regulator chip, a sixth resistance, a seventh resistance, an eighth resistance, and a first capacitance;

a first end of the fourth resistance is connected to the control voltage, and a second end of the fourth resistance is connected to a public connection point between a first end of the fifth resistance and an anode of the output diode of the optocoupler;

a second end of the fifth resistance is respectively connected to a first end of the voltage regulator chip and a cathode of the output diode of the optocoupler;

a second end of the voltage regulator chip is grounded, a third end of the voltage regulator chip is connected to a public connection point between a first end of the sixth resistance and a first end of the seventh resistance;

a second end of the sixth resistance is connected to the control voltage and a second end of the seventh resistance is grounded;

a first end of the eighth resistance is connected to a public connection point between the second end of the fifth resistance and the first end of the voltage regulator chip, and a second end of the eighth resistance is connected to the first end of the first capacitance; and the second end of the first capacitance is connected to the third end of the voltage regulator chip, the first end of the sixth resistance, and the first end of the seventh resistance.

8. The switching power supply protection circuit according to claim 1, wherein the control circuit comprises a voltage circuit, a transformer, and an output circuit;

the voltage circuit is respectively connected to the power supply and a first input end of the transformer and is used to receive a voltage of the power supply for charging and provide the supply voltage for the protection circuit;

a second input end of the transformer is respectively connected to the switching circuit and the power supply, and an output end of the transformer is connected to the output circuit; and the output circuit is electrically connected to the voltage feedback circuit and is used to control the supply voltage based on the control voltage.

9. The switching power supply protection circuit according to claim 8, wherein the voltage circuit comprises a first supercapacitor and a first diode; the transformer comprises a first primary winding, a second primary winding, a first secondary winding, and a second secondary winding; the first input end is an input end of the first primary winding and comprises a first end and a second end, and the second input end is an input end of the second primary winding and comprises a third end and a fourth end; the output end comprises a first output end of the first secondary winding and a second output end of the second secondary winding; the output circuit comprises a first output circuit and a second output circuit;

a first end of the first supercapacitor is respectively connected to the power supply and a cathode of the first diode, and a second end of the first supercapacitor is grounded;

an anode of the first diode is connected to a fourth end of the second primary winding; the first end of the first primary winding is connected to the power supply, the second end of the first primary winding is connected to the switching circuit, and the third end of the second primary winding is grounded; and the first output end of the first secondary winding is connected to the first output circuit, and the second output end of the second secondary winding is connected to the second output circuit.

10. The switching power supply protection circuit according to claim 9, wherein the first output circuit comprises a second diode and a second supercapacitor, wherein an anode of the second diode is connected to a fifth end of the first secondary winding, a cathode of the second diode is connected to an output voltage terminal, a first end of the second supercapacitor is connected to the cathode of the second diode, and a second end of the second supercapacitor is connected to a sixth end of the first secondary winding which is grounded.

11. The switching power supply protection circuit according to claim 9, wherein the second output circuit comprises a third diode and a third supercapacitor, wherein an anode of the third diode is connected to a seventh end of the second secondary winding, a cathode of the third diode is connected to an output voltage terminal, a first end of the third supercapacitor is connected to the cathode of the third diode and a second end of the third supercapacitor is connected to an eighth end of the second secondary winding which is grounded.

12. The switching power supply protection circuit according to claim 9, wherein the output voltage of the second output circuit is the control voltage, and wherein the control voltage is further configured to control the output voltage of the first output circuit and the supply voltage through the transformer.

13. The switching power supply protection circuit according to claim 1, further comprising a starting resistance, a protective resistance, a protective capacitance, and a protection diode;

a first end of the starting resistance is connected to the power supply and the control circuit, a second end of the starting resistance is respectively connected to the protection circuit and the control circuit;

a first end of the protective resistance is connected to the power supply, and a second end of the protective resistance is respectively connected to a second end of the protective capacitance and a cathode of the protection diode;

the second end of the protective capacitance is connected to a public connection point between the first end of the protective resistance and the power supply; and an anode of the protection diode is connected to the switching circuit and the control circuit.

14. The switching power supply protection circuit according to claim 13, wherein the protection diode is further connected to a collector of a switching tube of the switching circuit and a second end of a first primary winding of a transformer of the control circuit.

15. A power supply system, comprising the switching power supply protection circuit according to claim 1.

16. The switching power supply protection circuit of claim 1, wherein the protection circuit is configured to switch off the output and correspondingly switch-off the switching circuit and the control circuit when the supply voltage reaches a first voltage value, and to restore operation of the switching circuit and the control circuit when the supply voltage drops to a second voltage value, the second voltage value being different from the first voltage value.

17. A method for protecting a switching power supply, the switching power supply comprising a protection circuit connected to a switching circuit, a voltage feedback circuit, and a control circuit, the switching circuit connected to the control circuit, the voltage feedback circuit connected to the control circuit, and the control circuit connected to a power supply, the method comprising:

receiving, by the control circuit, a voltage of the power supply for charging;

providing, by the control circuit, a starting voltage to the protection circuit; and controlling, by the control circuit, a supply voltage based on a control voltage of the control circuit;

controlling, by the switching circuit, a working state of the control circuit, wherein the working state comprises working and stop-working;

obtaining, by the protection circuit, the supply voltage based on the control voltage of the control circuit;

controlling, by the protection circuit, output switch-on or output switch-off based on the supply voltage and correspondingly controlling switch-on or switch-off of the switching circuit based on the output switch-on or the output switch-off;

controlling, by the protection circuit, the supply voltage based on a feedback voltage of the voltage feedback circuit.

* * * * *